United States Patent
Dolan et al.

[11] Patent Number: 6,039,449
[45] Date of Patent: Mar. 21, 2000

[54] RETAINER CLIP FOR A VEHICLE REARVIEW MIRROR

[75] Inventors: Daniel J. Dolan, Chalfont; John S. McPherson, Perkasie, both of Pa.

[73] Assignee: Delbar Products, Inc., Perkasie, Pa.

[21] Appl. No.: 09/158,837

[22] Filed: Sep. 23, 1998

[51] Int. Cl.$^7$ .................................................. G02B 7/182
[52] U.S. Cl. ........................................ 359/871; 359/872
[58] Field of Search ................................ 359/871, 872, 359/877, 874; 307/10.1

[56] References Cited

U.S. PATENT DOCUMENTS

| | | | |
|---|---|---|---|
| 4,234,153 | 11/1980 | Chihara et al. | 248/475 B |
| 4,253,633 | 3/1981 | Takegawa | 248/475 B |
| 4,422,724 | 12/1983 | Otsuka et al. | 248/475 B |
| 4,441,681 | 4/1984 | Oda et al. | 248/475.1 |
| 4,592,529 | 6/1986 | Suzuki | 248/475.1 |
| 4,593,878 | 6/1986 | Stewart | 248/549 |
| 4,597,603 | 7/1986 | Trabert | 296/194 |
| 4,645,164 | 2/1987 | Manzoni | 248/475.1 |
| 4,973,147 | 11/1990 | Fujita et al. | 359/877 |
| 5,261,650 | 11/1993 | Hein | 267/220 |
| 5,274,505 | 12/1993 | Nagayama et al. | 359/874 |
| 5,294,084 | 3/1994 | Syamoto et al. | 359/877 |
| 5,314,149 | 5/1994 | Pim et al. | 248/56 |
| 5,535,553 | 7/1996 | Staser et al. | 49/502 |
| 5,576,899 | 11/1996 | Englander | 359/871 |
| 5,604,645 | 2/1997 | Weaver | 359/877 |
| 5,667,271 | 9/1997 | Booth | 296/192 |
| 5,685,682 | 11/1997 | Glime et al. | 411/510 |
| 5,697,665 | 12/1997 | Itou et al. | 296/146.1 |

*Primary Examiner*—Cassandra Spyrou
*Assistant Examiner*—Euncha Cherry
*Attorney, Agent, or Firm*—Gregory J. Gore

[57] ABSTRACT

A temporary snap-in, hold-down, clip includes two sets of snap-fit fingers at opposite ends of a central sleeve for the purposes of temporarily holding a mirror housing to a vehicle body panel during the vehicle assembly process. One set of snap-fit fingers engages the mirror housing and an opposite set of fingers on the clip engages the inside edge of the vehicle body panel hole which normally receives an electrical wiring tail from the mirror assembly. The locking surfaces of barb-like heads on the two sets of fingers are designed so that the clip is more securely held to the mirror housing than to the body panel. A cylindrical sleeve portion of the clip projects outwardly and extends past the mirror housing gasket interposed between the housing and the body panel. The wiring tail passes through the sleeve unless the gasket is protected from the wiring tail as the wiring tail is pulled to the side by the installer. The clip may be either integrally molded with the mirror housing or be provided as a separate part.

18 Claims, 3 Drawing Sheets

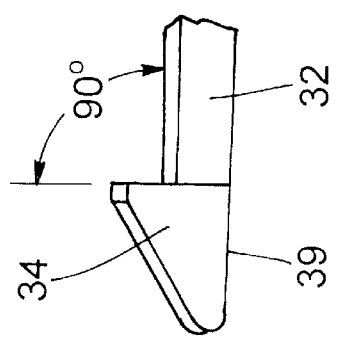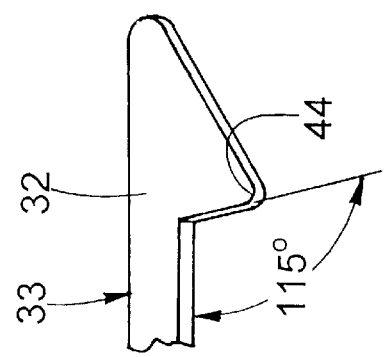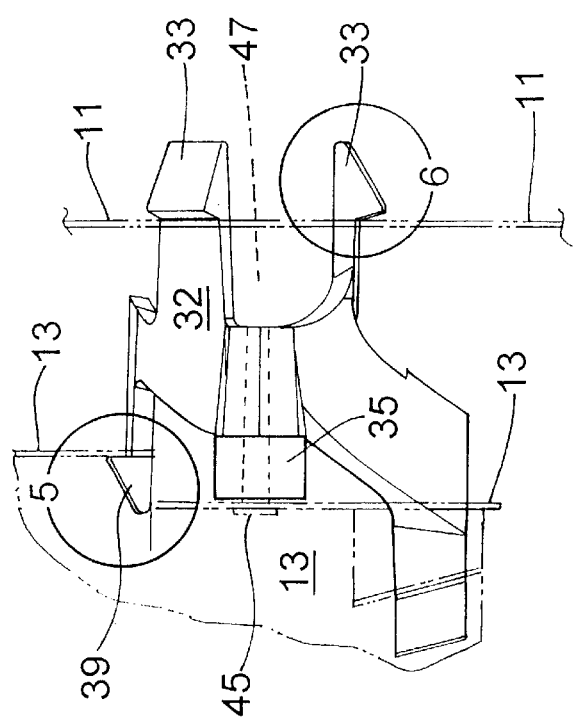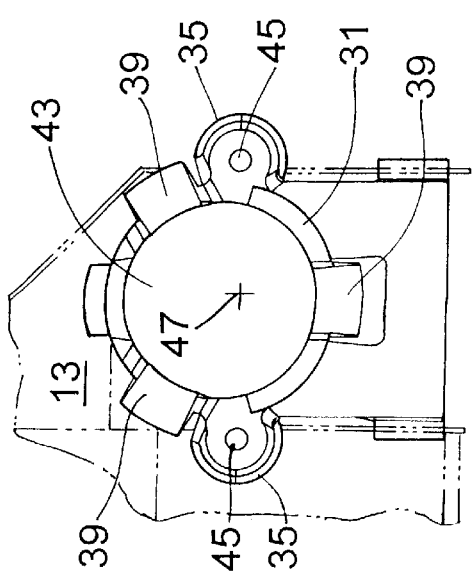

RETAINER CLIP FOR A VEHICLE REARVIEW MIRROR

FIELD OF THE INVENTION

The present invention relates to a temporary hold-down device for an automotive rear view mirror for attachment to the outside of the vehicle door panel. More particularly, it relates to a device for temporarily holding the mirror in position during the vehicle assembly process so that the mirror housing is held in place while the assembly worker secures fasteners from the opposite side of the door panel.

DESCRIPTION OF THE PRIOR ART

Modern automotive side mounted rear view mirrors are often electrically controlled and provided with a wiring tail for electrical connection to a positioning motor within the mirror housing. During the vehicle assembly process, the connector is placed through a hole in the body panel of the vehicle and is attached by a mating connector to the main electrical wiring harness. When the mirror housing is attached to the body panel of the vehicle along an assembly line, screw studs which project from the mirror housing to which they are affixed are fitted through properly registered holes in the body panel from the outside of the panel. Fastening nuts are then secured to the studs from the inside of the panel.

This procedure usually requires two workers, one holding the mirror in place from the outside of the door panel and the other worker applying the fasteners from the inside while the mirror housing is held in place. Thus, the mirror mounting process is very labor intensive. Also, there is a problem with handling the wiring tail prior to assembly. Prior to installation, workers often grasp the rear view unit by the tail which often pulls the tail to the side tearing the sensitive rubber gasket which is placed around the base of the mirror housing. Therefore, there is a need in the art for means to reduce the labor required for rear view mirror mounting to a vehicle door panel during assembly and also to protect the delicate wiring tail and housing gasket during the mirror unit handling and installation process.

Although the use of snap-fit clips is known in the field of rear view mirror housings, there is no known use of this type of attachment means for temporarily holding the rear view mirror housing unit to the vehicle door panel. U.S. Pat. No. 5,604,645 issued to Weaver discloses the use of snap fit clips as a mounting bracket for a rear view mirror positioning motor. U.S. Pat. No. 4,253,633 issued to Takegawa discloses the use of a quarter turn clamping mechanism for holding a mirror base permanently to the vehicle door panel.

SUMMARY OF THE INVENTION

In order to solve the problems of the prior art as described above, the temporary snap in clip of the present invention has been devised. In one embodiment, the clip as a separate element includes two sets of snap-fit fingers at opposite ends of a central sleeve, one set of fingers engaging the mirror housing and an opposing set of fingers engaging the inside edge of the vehicle body panel aperture which receives the electrical wiring tail. Because the clip engages existing structures on both the mirror housing and body panel, no additional modifications need to be made to either of these structures to use the clip. The clip of the present invention is therefore very economical to employ. In another embodiment, this clip is molded integrally with the housing and only one set of outwardly-projecting, snap-fit fingers are present.

In either embodiment, the operation of the clip is the same. The clip comes pre assembled with or is an integral part of the mirror housing and includes a centrally located ring-like sleeve for receiving passage of the electrical wiring tail. The sleeve extends past the mirror housing gasket so that it protects the gasket from the electrical wiring tail if the tail is pulled to the side prior to installation. At the side of the mounting clip which projects away from the mirror housing, a series of circumferentially spaced snap-fit fingers are located around the periphery of the clip sleeve. These snap-fit fingers are positioned so that they engage the inside edges of a hole in the vehicle panel which normally receives the wiring tail. Since the wiring tail passes down through the center of the clip, the snap fingers and electrical wiring tail are inserted into the body panel simultaneously. As the projecting fingers of the clip snap into the body panel, the mirror housing becomes loosely affixed to the panel. Thus, manual support by the worker from the outside of the body panel is no longer needed. With the mirror housing temporarily held in place, the worker may then move to the inside of the body panel and apply the fasteners which firmly secure the mirror housing to the body panel. Thus, mounting the mirror housing to the vehicle body panel may be accomplished by only one worker instead of two.

In the embodiment of the present invention, wherein attachment clip is a separate part, it includes two sets of snap-fit fingers at opposite sides whereby it is first snapped into the mirror housing and then into the body panel as the mirror is installed. In this case, the set of snap-fit fingers which engage the mirror housing are designed so that the back-facing locking edge of the fingers is at a much steeper angle than the locking edge of the snap-fit fingers which engage the body panel. Therefore, the clip is held more securely to the mirror housing than to the body panel when the three structures are joined. Thus, if a mirror housing temporarily held in place but not yet fastened needs to be removed, it can simply be pulled away from the body panel with the clip retained in engagement with the mirror housing ready for re-installation. The clip is made of a suitably flexible plastic material so that the mirror housing may be inserted and removed many times without loss of holding force or damage to the body panel. In order to facilitate installation of the clip into the mirror housing indexing means are provided to properly align with the mirror housing as it is press-fitted into place. In one embodiment, the indexing means are alignment guides which project radially from the outside of the clip sleeve. These guides cooperate with structures in the mirror housing so that radial positioning of the clip with respect to the housing is easily determined.

The clip is made of a suitably flexible plastic material so that the mirror housing may be inserted and removed many times without loss of holding force or damage to the body panel. In order to facilitate installation of the clip into the mirror housing, indexing means are provided to properly align the clip as it is press-fitted into place. In one embodiment, the indexing means are alignment guides which project radially from the outside of the clip sleeve. These guides cooperate with pins in the mirror housing so that the proper insertion position of the clip with respect to the housing is easily determined when the clip is fitted into the housing.

It will therefore be appreciated that the object of the present invention to provide a temporary hold down device to reduce the labor cost of assembling a rear view mirror to a vehicle body panel has been achieved. Furthermore, the temporary hold down structure provides a guard between the wiring tail and the mirror housing gasket to prevent damage to either component during the vehicle assembly process. Other objects and advantages of the invention will be further understood with regard to the accompanying drawings which illustrate the preferred embodiments of the invention.

BRIEF DESCRIPTION OF THE DRAWINGS

FIG. 3 is a front view of the present invention installed in the mirror housing.

FIG. 4 is a left side view showing the mounting clip of the present invention installed between the mirror housing and the vehicle panel.

FIG. 5 is an enlarged view of a panel attachment snap finger as shown in FIG. 4.

FIG. 6 is an enlarged view of a mirror housing snap finger as shown in FIG. 4.

DESCRIPTION OF THE PREFERRED EMBODIMENT

Figure 1:
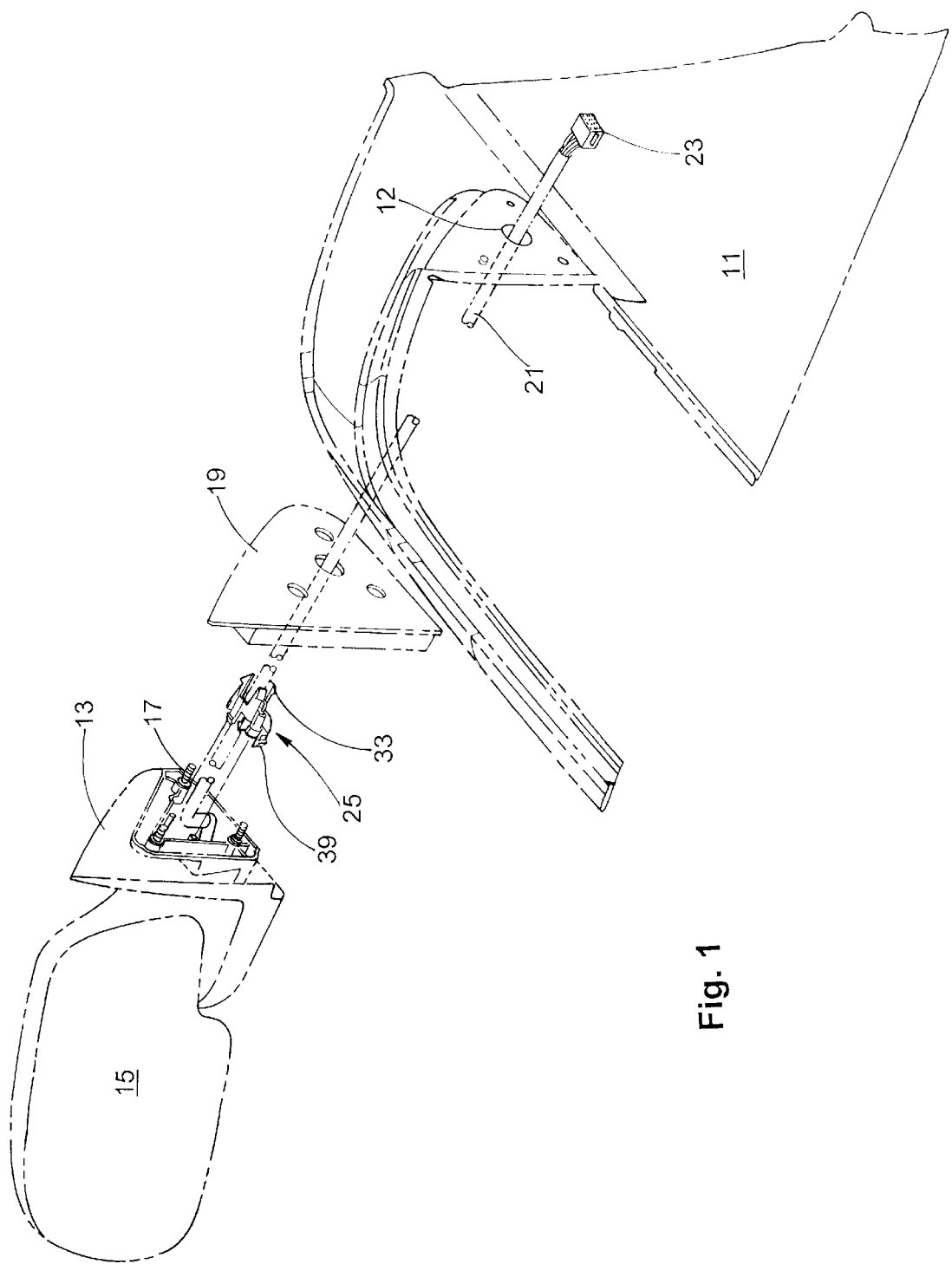
FIG. 1 is an isometric assembly view showing the relationship between the mounting clip of the present invention and the other assembled components.

Referring now to FIG. 1, the mounting clip of the present invention 25 is shown as a separate element of the rearview mirror housing assembly. The housing 13 includes mirror element 15 and three mounting studs 17 which project outwardly in the direction of attachment. As the housing is installed into vehicle panel 11, wiring tail 21 is fitted through gasket 19 and vehicle panel wiring hole 12. The wiring tail terminates in connector 23 which ultimately plugs into the vehicle wiring harness. The mounting clip 25 of the present invention includes a central aperture to receive passage of the wiring tail 21. As will be further described herein, the mounting clip 25 includes separate sets of snap-fit fingers on opposite sides; one set 39 to engage with the rearview mirror housing, and the other set 33 to engage edges of the wiring hole 12 in the vehicle body panel 11. The length of the shanks of the outward projecting snap-in fingers which engage the body panel are dimensioned so that the mirror housing assembly is loosely held to the body panel, yet held closely enough so that mounting studs 17 adequately protrude through the opposite side of the body panel 11. Thereafter, fastening nuts (not shown) are threaded onto the ends of the studs and tightened down, thus completing the mounting process of the rearview mirror housing to the vehicle body panel.

Figure 2:
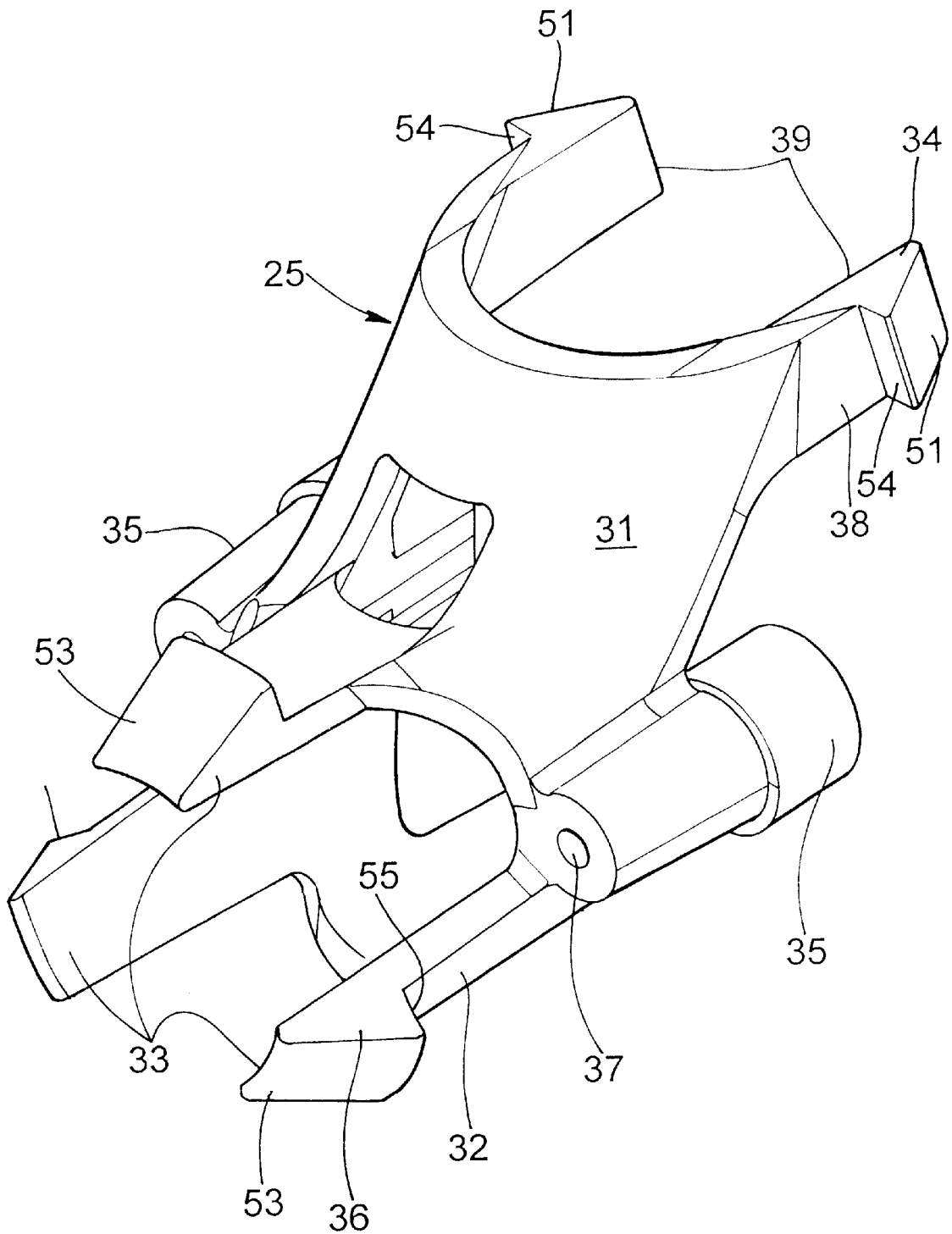
FIG. 2 is a top right front isometric view of the mounting clip of the present invention.

Referring now to FIG. 2, a detailed and enlarged view of the mounting clip 25 of the present invention is depicted. The clip includes a ring-like cylindrical sleeve 31 with two sets of snap fingers, a first set 39 and a second set 33, each projecting from opposite ends of the sleeve. Each snap-fit finger 39 of the first set includes barb-like heads 36 at the end of shanks 32. Similarly, snap-fit fingers 33 of the second set include shanks 38 and barb-like heads 34. The two sets of heads have angled side surfaces 51 and 53 and backward-facing engagement surfaces 54 and 55. Side-mounted lugs 35 include central apertures 37 for providing indexing pins on the housing to ensure proper alignment to the rearview mirror housing and to guide the clip 25 as it is installed in the housing.

Referring now to FIG. 3, the mounting clip sleeve portion 31 has a central aperture 43 that receives the wiring tail as depicted in the assembly drawing of FIG. 1. The clip is first installed into the mirror housing 13 by means of snap fingers 39 which engage the backside of structures on the mirror housing which are perpendicular to the axis 47 of the clip sleeve. As the clip is installed, mounting lugs 35 are fitted about indexing pins 45 which project outwardly from the mirror housing 13. This combination lugs and pins provides indexing means for properly orienting and guiding the clip when the clip is installed into the mirror housing.

Referring now to FIG. 4, the mounting clip is shown engaged with both mirror housing 13 and body panel 11. Lug 35 is fitted about mounting pin 45. All snap-fit fingers project from opposite peripheral edges of the sleeve portion parallel to axis 47. The backsides of one set of snap-fit fingers 39 engage structural elements of the mirror housing 13 recessed within the housing to accommodate the length of the clip. Vehicle body panel 11 is engaged by the other set of snap-fit fingers 33 on the opposite end of the clip. Fingers 33 include elongate shanks 32 which are dimensioned such that when the mounting clip is fully engaged between the mirror housing and the vehicle panel, the mirror housing is loosely affixed thereto.

One of the important aspects of the present invention is the design of the snap-fit fingers which provide a greater strength of attachment to the mirror housing than to the vehicle body panel. This is achieved by two main design factors of the snap-fit fingers: the length of the shanks, and the undercut angle on the backside of the heads which provides the engagement locking surface of the fingers. By making the shanks of the body panel fingers longer and the undercut angle shallower than the mirror housing mounting fingers, the pullout force of the clip from the vehicle body panel is considerably less than the pullout force of the clip from the mirror housing. It will be readily understood by those of ordinary skill in the art that another embodiment of the present invention which provides integral molding of the clip with the mirror housing does not include any structures other than the central sleeve and the outwardly projecting set of body-engaging snap-fit fingers. The other structures found on the separate clip embodiment are not included because insertion alignment and attachment to the mirror housing is obviated.

FIGS. 5 and 6 depict the relative undercut angles and shapes of the mirror housing snap fingers and the body panel snap fingers respectively. The mirror housing snap fingers 39 shown in FIG. 5 have an included undercut angle with shank 32 of approximately 90 degrees on the backside engagement surface 54 of the barb-like head 34. The snap finger 33 shown in FIG. 6 has an undercut angle of approximately 115 degrees measured between engagement surface 55 and shank 32. It will be readily appreciated by those of skill in the art that the pullout force of the snap finger barb shown in FIG. 5 is thus greater than that shown in FIG. 6 because the undercut angle is steeper. This difference in pullout force allows the mirror assembly to be temporarily installed in the vehicle panel and removed, and then later reinstalled without de-mounting the clip from the mirror housing. When the mirror housing is pulled away from the body panel, the reduced forces between the body panel snap fingers also ensures that the rearview mirror assembly may be removed and reinstalled many times without damage to the body panel. Removal is also facilitated by rounding off the outer corners 44 of the panel-engaging fingers as shown in FIG. 6.

It will, therefore, be appreciated from the description of the preferred embodiments, that the various objects the present invention have been achieved. The temporary snap-in capability of a rear view mirror unit vastly reduces the amount of labor during vehicle assembly. Furthermore, it will be readily understood by those who are skilled in the art that the temporary snap-fit attachment means are purely sacrificial. That is, they do not perform any function once the mirror housing unit has been securely fastened by the studs. Because the snap-in means are made of plastic and are securely fastened to the mirror housing by integral molding or secure snap-fit, there is no chance of undesirable rattle or other noise created by the clip. Once the mirror housing is securely fastened by the studs, there is a gap between the locking edges of the snap fingers and the body panel.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A rear view mirror, including a temporary hold-down clip for holding said mirror to a vehicle body panel during vehicle assembly, comprising:
    a mirror housing with a mirror affixed thereto;
    a plurality of fastening studs secured to said housing and projecting therefrom in a direction of attachment to said vehicle body panel;
    a sleeve having an aperture, said sleeve projecting from said housing in the direction of attachment of said studs; and
    a set of elongate snap-fit fingers located around an outer periphery of said sleeve, said fingers including shanks projecting outwardly from said housing in said direction of attachment whereby said rear view mirror is temporarily held to said vehicle body by said snap-fit fingers inserted into said body panel, said body panel being a portion of said vehicle body.

2. The rear view mirror of claim 1, further including a wiring tail connected to electrical components within said housing, a terminal end of said tail passing through said sleeve and extending externally from said mirror housing.

3. The rearview mirror of claim 2, further including a gasket located around said sleeve whereby said wiring tail is guarded against contact with said gasket by said sleeve.

4. The rearview mirror of claim 1, wherein said fingers comprise barb shaped heads having back-facing locking edges.

5. The rearview mirror of claim 1, wherein said sleeve and said snap-fit fingers are molded integrally with said housing.

6. The rearview mirror of claim 1, wherein said sleeve and said snap-fit fingers are affixed to said housing by attachment means.

7. The rearview mirror of claim 6, wherein said attachment means are snap-fit fingers.

8. The rearview mirror of claim 2, wherein said electrical components comprise a mirror positioning motor.

9. The rear view mirror of claim 4, further including indexing means radially projecting from said sleeve for abutment with cooperating structures on the mirror housing to radially position said sleeve with respect to said housing.

10. The rear view mirror of claim 1, wherein said snap-fit fingers each engaging the inside edge of a single aperture in said body panel.

11. The assembly of claim 10, wherein said snap-fit fingers each include one of said shanks that has sufficient length such that said mirror housing is loosely held to said panel when said fingers are fully engaged.

12. The assembly of claim 11, further including a wiring tail connected to electrical components within said housing wherein said wiring tail passes through said aperture of the sleeve and said body panel.

13. The assembly of claim 10, further described in that said body panel aperture is circular.

14. The rear-view mirror of claim 3, wherein an outer circumferential edge of said gasket is co-extensive with the outer edges of said mirror housing.

15. The rear view mirror of claim 9, wherein said indexing means are lugs affixed to opposite sides of said sleeve, each lug including a recess for receiving a separate pin, said pins being affixed to and projecting outwardly from the mirror housing in said direction of attachment.

16. A vehicle rear view mirror, comprising:
    a rear view mirror housing;
    a connector including a ring-shaped sleeve having an aperture with an axis perpendicular to a plane of said aperture and further having two sets of opposite facing snap-fit fingers at opposite ends thereof;
    a first set of elongated snap-fit fingers engaging said mirror housing, each finger having a shank extending axially from the periphery of a first side of said sleeve;
    a second set of snap-fit fingers having elongate shanks extending axially from the periphery of said sleeve at an opposite side thereof; and
    each of said snap-fit fingers including a barb-shaped head and a back-facing locking edge which meets the shank of said finger at an angle.

17. The rear view mirror of claim 16, wherein the angles of the locking edges of said first set of snap fingers are all the same and are substantially steeper than the angles of the locking edges of said second set of snap fingers.

18. A method for securing a mirror housing having a wiring tail to an automotive vehicle body panel, the method comprising the steps of:
    providing a mirror housing having fasteners for rigid affixation to an automotive vehicle body panel, said housing including a mirror and an electrical driving device for driving the mirror;
    providing a connector sleeve extending from said mirror housing in the direction of said vehicle body panel, said connector sleeve including a plurality of snap-fit fingers; said fingers including shanks projecting outwardly from said mirror housing;
    providing a wiring tail from said electrical driving device which passes through said connector sleeve;
    passing the end of said wiring tail through an aperture in said body vehicle panel;
    inserting said snap-fit fingers of said connector sleeve into said body vehicle panel aperture to loosely hold said mirror housing in position for rigid affixation to the body panel; and
    securing said mirror housing to said body vehicle panel by rigid affixation utilizing said fasteners.

* * * * *